March 17, 1959 W. OBERMANN 2,878,173
METHOD FOR CATHODIC PROTECTION OF SHIP HULLS IN
SEA WATER BY ELECTRON CONCENTRATION
Filed June 4, 1957 2 Sheets-Sheet 1

INVENTOR
WALTER OBERMANN

BY *Morris Fidelman*

ATTORNEY

March 17, 1959  W. OBERMANN  2,878,173
METHOD FOR CATHODIC PROTECTION OF SHIP HULLS IN
SEA WATER BY ELECTRON CONCENTRATION
Filed June 4, 1957  2 Sheets-Sheet 2

FREE CORROSION

CATHODIC PROTECTION BY POLARIZATION

CATHODIC PROTECTION BY ELECTRON CONCENTRATION

KEY
⊕ POSITIVE ION
⊖ NEGATIVE ION
− ELECTRON

INVENTOR
WALTER OBERMANN

BY *Morris Fiedelman*

ATTORNEY

United States Patent Office 2,878,173
Patented Mar. 17, 1959

2,878,173

METHOD FOR CATHODIC PROTECTION OF SHIP HULLS IN SEA WATER BY ELECTRON CONCENTRATION

Walter Obermann, Leonia, N. J.

Application June 4, 1957, Serial No. 663,406

4 Claims. (Cl. 204—147)

This invention relates to a system for cathodically protecting ship hulls in a sea-water environment.

It is generally recognized that pit corrosion on the hull of a steel vessel is attributable to the formation of anodic areas at the hull surface, together with concomitant cathodic areas on the steel surface. The anodic areas corrode, while the cathodic areas remain clean and uncorroded. Because the hull electrical resistance is so small and conductivity of sea water so high, large quantities of current can flow between anode and cathode regions. As a result, severe pitting on the outer hull is a serious problem faced by ship owners. The anodic and cathodic areas constantly shift, and isolation of individual pits is impossible.

By and large the art has appreciated the corrosion problems involved in operating steel vessels, and many suggestions have been made for cathodically protecting steel hulls. Plates of higher galvanic surface voltage, such as zinc, magnesium and aluminum have been placed upon vessels so as to sacrificially corrode (as anodic areas), while the steel hull became cathodic and remained uncorroded.

Power fed anodes also have been installed on steel vessels. In their operation sufficient current is drained from the anodes to render the entire hull cathodic. This involves raising the potential of the entire hull 200–300 millivolts above its normal (freely corroding) potential in sea water as measured by any standard half-cell. Prior to the instant invention the cathodic protection art has taken the position that in order to protect metal cathodically it is necessary to polarize all local cathodes to the open circuit potential of all local anodes; this occurs when the metal is raised to an open circuit potential reading of —0.78 bolt to a saturated calomel half-cell. In short the purpose of these power fed anodes is to polarize the entire hull surface. Protection of a hull by the polarization mechanism presents several serious problems. First and foremost of these problems is that polarization actually requires raising the entire hull to this —0.78 volt surface voltage. At this level, a minute layer of hydrogen is evolved at the hull surface. When the ship is underway, turbulence acts to rapidly remove this protecting hydrogen layer. The turbulence makes complete protection possible, but only at high current densities. Many anodes must be used to supply the high current density required to achieve polarization. Frequently control instruments are installed to automatically maintain the hull potential at —0.78 v. for the purpose of avoiding possible paint stripping by excess osmotic pressure drive through the paint film should the voltage drop across the paint film rise as a result of excessive current.

An ever present problem of changing current density faces installers of power fed polarization type of cathodic protection systems. Shortly after drydocking and painting the hull of a ship there is little equivalent "bare" metal exposed on the hull surface to which current can flow. As a result, a low current density (per square foot of hull area) suffices to achieved the desired polarization. However, after the ship has been at sea for several months, the paint film has deteriorated somewhat, revealing a greater equivalent "bare" metal, and a much higher current density is required to attain the same polarization.

In addition to paint condition, paint type, velocity of ship and temperature and conductivity of seat water are factors which govern polarization current density requirements. With the ship underway, average current density in these polarization systems may have to be increased from two to ten times that necessary with the ship at rest.

The prime object of the instant invention is to provide a power fed cathodic protection system which avoids the disadvantages of polarization systems.

Another object of this invention is to provide a cathodic protection system which will achieve the same or a superior degree of corrosion elimination as achieved by a polarization system while maintaining a hull potential equal to that of freely corroding steel; generally this will be less than —0.6 volt with reference to a saturated calomel electrode.

A further object of this invention is to provide a protection system employing a smaller number of anodes than has heretofore been necessary.

A further important object of this invention is to provide a system of hull cathodic protection whereby each anode functions to eliminate corrosion without regard to total current output of the system. In opposition there are polarization type systems where anodes must act as a concerted group to supply enough current to simultaneously raise all steel surface areas to a protective potential.

Briefly stated this invention contemplates protecting a ship by providing a power fed anode for every 5,000 to 20,000 square feet of ship, and impressing at least 3 volts on the anode. By and large 3 or more anodes are necessary on commercial ships exceeding 15,000 square feet of submerged hull surface. Applicant's copending prior application, S. N. 499,262, filed April 5, 1955, of which the instant application is a continuation in part, has disclosed how stern frame corrosion can be prevented on a large vessel by placing one or two anodes well forward of the stern frame. It has now been discovered that an entire large vessel may be protected by providing three or more high resistance anodes of the type hereinafter described. High resistance anodes act individually to secure protection against corrosion. Thus each anode will by itself protect an area of at least 5,000 square feet. In the manner pointed out in the prior application, two high resistance anodes can protect the stern area of a ship, permitting the bow section to corrode as if no installation were present on the ship.

Each anode must be built to a design which provides at least 0.45 ohm circuit resistance when passing current from the anode to a sea-water (Gulf Stream) environment. Resistance is primarily a function of anode size. The resistance must be measured between the anode itself and the hull. It can be measured by recording the voltage difference between anode and hull and the current flow, and computing the resistance by ohms law. It is appreciated that to term this resistance an "anode resistance" may to some extent be misleading because the anode itself, being a good conductor, has an intrinsic resistance of less than a thousandth of an ohm. The steel hull, being a good conductor and having such a large area, also has an intrinsic resistance of less than a thousandth of an ohm. Similarly the sea water, even though it is not quite as good a conductor, has such a large volume that from any point a distance more than two feet from the anode to any point in the hull its resistance is less than a 100th of an ohm. What is actually computed as the resistance is the anode to sea water interface resistance and the sea water resistance in the immediate region of the anode. This resistance is what applicant desires to maintain at a high level. The term "high resistance anode" is intended to refer to the measurement just specified. As a specific example of such an anode applicant has employed a platinum rod ⅜ inch diameter with 16 inches of length exposed to sea water. The resistance of this anode was 0.7 ohm when measured in the electrical flow path indicated above in Gulf Stream waters.

Anodes for polarization type systems generally have as low resistance as possible so as to obtain the greatest amount of current output at the lowest possible power consumption. Resistance values of commonly used anodes for polarization type systems in sea water is in the range of 0.2 to 0.4 ohm and frequently less. Anodes of less than 0.4 ohm resistance are unable to produce cathodic protection by the electron concentration method of the instant invention, and are limited to polarization type service. Physically these polarization type anodes are longer, and generally of much larger surface area per unit length than those used in electron concentration systems. For example a 3 inch diameter by 60 inch long graphite anode has a resistance of 0.25 ohm.

By and large relatively short (less than 30 inches) anodes formed in the shape of small diameter rods, or similar low surface area shapes have the desired resistance of at least 0.45 ohm. The resistance value of the electrical flow path, not the anode material, is the critical factor; any material, such as platinum group metals, graphite, lead-silver, silicon-iron alloys, etc., may be used for anodes. The platinum group metals are preferred over other materials because they show no deterioration in use.

The 3 or more anodes may be placed at any desired location on the submerged portion of the hull. They may be, of course, symmetrically disposed around the hull, but from an engineering viewpoint, anodes are best located where they will be subject to the least possible chance of physical damage. Preferred location is hereinafter set forth, but is to be regarded as an arbitrary engineering decision and not fundamental to electron concentration cathodic protection systems.

A second limiting criterion to the protection system is that a voltage potential (relative to the hull) exceeding 3 volts must be applied to each anode. Higher voltages may be used, but voltage should not ordinarily exceed about 40 volts.

By and large the current applied from the anodes is relatively low. For well painted ships, current density can range down to 0.05 milliampere per square foot of hull area. On ordinary commercial vessels, a higher current density would be applied, particularly for the time several months after drydock when the paint film has deteriorated somewhat. Thus no actual upper limit for current density can be given because it would depend on the particular ship, the number of anodes, the state of the paint film, and other variables. However, to list a representative value, the current density would not ordinarily exceed or even approach 10 milliamperes per square foot of submerged hull. Cathodic protection according to the practice of the instant invention has no relation to polarization of the hull; in actuality the current density applied to the hull from the anodes is far less than the density required to achieve polarization of the hull after the ship has spent several months in sea water, and at a time when the ship is underway.

Further advantages and distinguishing characteristics will be apparent from the detailed description which follows and with regard to the attached drawing wherein.

Figure 3A:
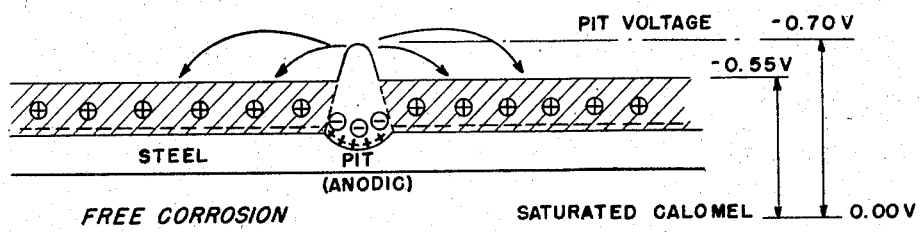

Figures 3A, B, C are diagrammatic representations of the electrical circuits of free corrosion, cathodic protection by polarization and by electron concentration, respectively.

Figure 1:
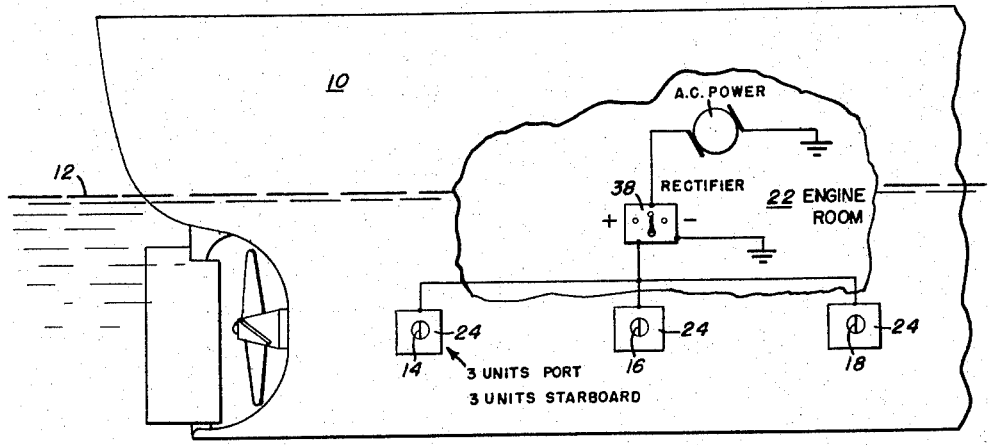
Figure 1 is a side view of a ship's hull showing the preferred location of the anodes.
Figure 2:
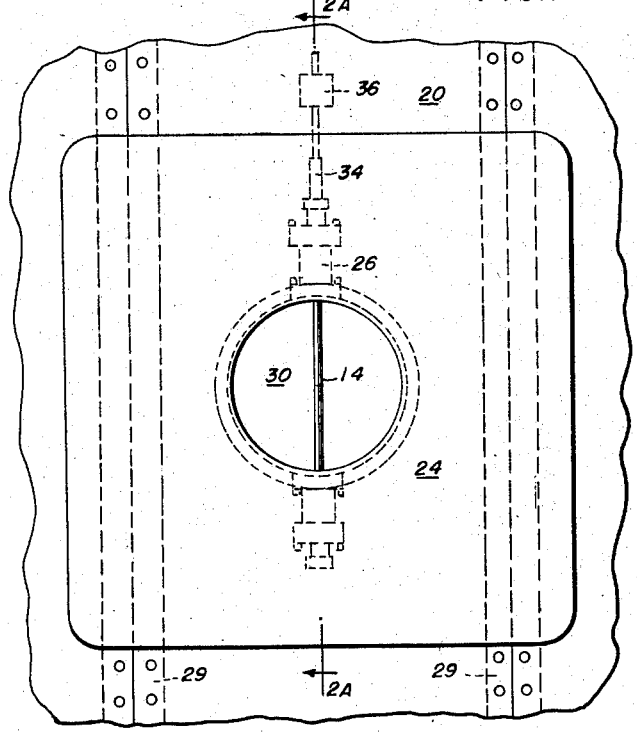
Figure 2 is an enlarged view of a portion of Figure 1 showing the details of anode construction and attachment to the hull, and the electrical circuit for the anode.

As shown in Figures 1 and 2, the drawings illustrate the application of multiple anodes to protect the entire hull of ship 10 against the severe corrosion which would otherwise occur below the water line 12. Pursuant to the invention, multiple anodes 14, 16, 18 are disposed on the outer wall of the ship's hull below the water line. Six anodes are illustrated at the preferred locations for protecting the hull of a ship having about 40,000 square feet of submerged surface. The anodes are spaced apart along the shell plating 20 of the engine room 22 where convenience and accessibility dictate their exact location. Three anodes are on the port side, while the remaining three not visible are starboard.

On a tankship and many of the modern general cargo vessels, the engine room is aft. In many ships narrowing of the hull begins to take place at the furthermost forward bulkhead of the engine room (about ¼ the length of the ship from the skeg). In effect the engine room is a recessed area of hull which is free of scraping during docking operations or during passage through narrow waterways such as canal locks; anodes located here are generally safe. The cost of running power lines to the anodes is also kept low because the anodes are adjacent the engine room.

Once the high IR drop region near the anode has traversed by current (about two feet), the number of parallel paths which the current may take through the sea water approaches infinity, the current per path approaches zero and so does the IR drop through remainder of the sea water path. Therefore there is no limit placed on distance from anode to cathode. Again, in the metallic circuit (the hull) resistance is extremely low (less than 0.001 ohm between any two points) and there is no limitation placed on current flow. Rearward placement of anodes, therefore, does not prevent attainment of complete protection for all underwater surfaces. Should an accident remove an anode from service, the major portion of the hull would remain under protection with the furthest extremity, the bow, as subject to whatever corrosion occurs.

As shown in the drawing, each anode is associated with a dielectric panel 24 mounted on the outer surface of the ship's hull. Panel 24 may be a plastic coating of zero water absorptivity, e. g. halogenated resins on a steel base. Alternatively, the dielectric panel may be a more elaborate arrangement comprising a laminate resin bonded cloth with a tin foil interlayer and, if desired, one or more layers of vinyl or rubber films. The marginal extremities of this dielectric panel need only be a distance of two to three feet from the anode. The panel per se forms no part of this invention and any suitable dielectric panel capable of insulating the anode from the hull and of withstanding the sea water may be utilized. As in polarization systems, the purpose of the panel is to insulate the anode from the hull and to make certain that the current does not concentrate (short circuit) at the hull portion directly adjacent the anode.

Figure 2A:
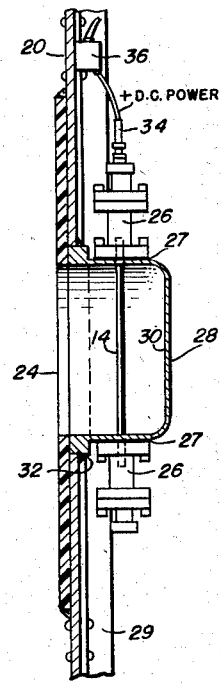
Figure 2A is an enlarged fragmentary sectional view taken on line A—A of Figure 2.

The anode is preferably, as shown in Figure 2A, mounted in a recessed casing 28 disposed between structural channels 29 of the hull. Casing 28 has a dielectric facing 30 made, for example, by forming the entire casing 28 of a dielectric material or by providing a porcelain or other dielectric liner 30 for a steel casing. In any event the casing is insulated against current flow just as panel 24. The casing 28 may be welded as at 32 into a cut-out part of the hull of the ship. The anode passes through opposite walls of casing 28 and is held in spaced relation to the outer walls of the casing. Sea water will wash through the casing 28 and surround the anode 14 when the ship is afloat. The ends of anode 14 passing through opposite walls of casing 28 may be maintained in water tight relation by providing spool pieces 36 and water tight gasketed joints including spring loaded seals (not shown) to maintain the ends of the anodes sealed in the walls of casing 28.

The anode 14 is connected by wiring 34 passing interiorly of the ship through a junction box 36 to a regulated low voltage D. C. power supply 38 so that a predetermined voltage will cause current to flow from the anode out into the sea water. The other anodes are similarly recessed into the hull inside casings 28, and are similarly insulated from the immediately surrounding hull areas to a distance of several feet by dielectric panels 24. Wiring 34 connects each of them to the low voltage D. C. power supply 38 so that the voltage is applied to all the anodes and current flows from them all. Control means 40 are provided for manually adjusting voltage should the need ever arise.

Again it will be emphasized that exact shape and method of mounting the anodes, choice and extent of hull insulation, as well as anode material are arbitrary engineering decisions which may be varied as desired within the scope of the invention.

The number of anodes required for complete hull protection depends primarily on the size of the ship and the adequacy of the paint film. Small ships, particularly if they are carefully coated with hot plastic systems or vinyl systems, will inherently be protected by the one or two high resistance anodes disposed according to the teachings of parent application S. N. 499,262 (for protection of the stern frame area). For large ships, particularly those in commercial service, having 15,000 square feet or more of submerged hull area, at least three anodes are required. Each anode will protect a region of from 5,000–20,000 square feet, depending largely upon the state and nature of the paint film. A general rule of thumb for ships exceeding 15,000 square feet of submerged hull area is an anode for about every 7,000 square feet. Thus 6 anodes of 0.7 ohm resistance disposed as illustrated in the drawing will protect a commercially painted ship of 40,000 square feet of submerged hull area when operated at 15 volts.

Since the paint film deteriorates during the interval between successive drydockings (and repainting) the equivalent area of bare metal on the hull gradually increases from its minimum on a freshly painted ship to its maximum at the time when the ship is due for drydock. Conceivably the applied voltage will polarize the ship's hull for a few weeks when the paint is new, thereby affording cathodic protection through polarization as well as by the "electron concentration" method of the instant invention. However, usually after several weeks (about 10) in service, paint (types common to merchant ships) dielectric strength will decrease to a point where reliance is fully on electron concentration.

Electron concentration systems have the advantage that they may be set at a fixed anode voltage, for example, 15 volts, and this setting will ordinarily not require increase or reduction during the entire time the ship is at sea between successive drydockings. Normal deterioration and abrasion of the paint, velocity of the ship, temperature and conductivity changes of the sea water have little effect; voltage setting would remain constant throughout.

On the other hand with polarization type cathodic protection systems, current requirements fluctuate continuously. A low level of current flow will polarize the hull of a freshly painted ship at rest in sea water. Some four or five months later a high level of current flow is required to polarize the hull of the moving ship because the paint has become less effective with age.

Generally the biggest problem which polarization systems face is underprotection by insufficient current output for the particular situation. Automatic control systems which vary current output have been used to maintain the potential of −0.78 v. to calomel (or other suitable reference cell). Such controls operate by measuring and keeping a 0.25 volt increment over the potential of freely corroding steel.

Obviously then, in the electron concentration system where surface voltage of the hull is at a level of freely corroding steel, there is no voltage difference to measure (as by a reference cell), and therefore no need for automatic control equipment of the types developed for polarization systems.

High resistance anodes of the electron concentration system can, of course, be employed in polarization systems for maintaining the hull at a polarized potential at all times (with automatic control actuated by a reference cell). There is no desire to include such a system within the scope of this invention. However, mere installation of automatic control equipment with high resistance anodes is not per se conclusive of operation under the prior art polarization techniques. The automatic control equipment could as well continuously operate the anodes at the highest voltage and highest current output obtainable from the power supply when polarization is not attainable, thereby falling within the scope of the instant invention.

Figure 3B:
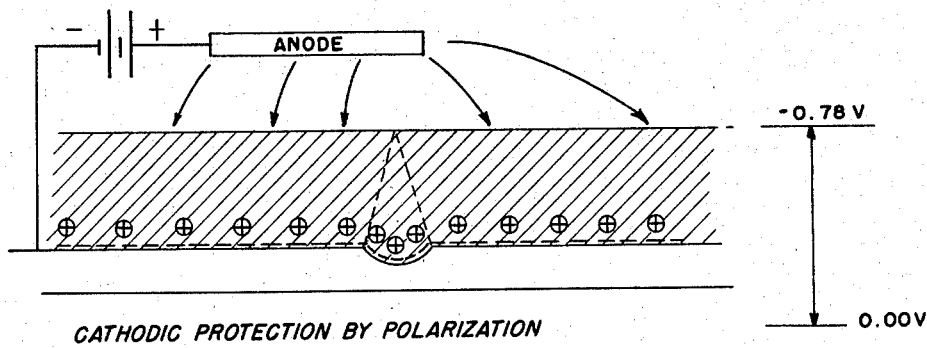
Figure 3C:
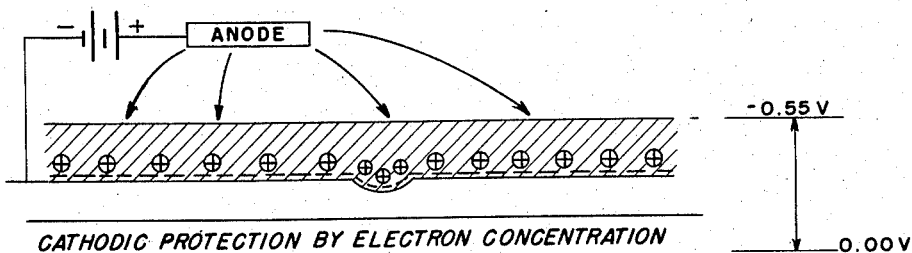

The differences between normal corrosion, cathodic protection through hull polarization, and protection according to the instant invention (which has been termed "protection by electron concentration"), are schematically illustrated in Figures 3A, 3B, 3C. Bare steel in sea water is recognized to undergo free corrosion with development of localized pits, and nearby cathodic areas. Figure A3 illustrates this pit type of corrosion where current is flowing from an anodic pit through the surrounding sea water to adjacent cathode areas. The voltage reading of freely corroding steel with reference to a standard calomel half cell is about −0.55 volt. Localized anodes can, however, be as high as −0.70 volt. The shaded portion represents the back E. M. F. generated by the current flowing into the cathode surface. The relative distribution of charged ions in the corroding region is shown by the "+" and "−" and the electrons on the steel surface by "−."

In polarization cathodic protection, current flow from the external anode is always into the cathode areas (areas of no corrosion), and no current will be sent into the anodic pit (corroding point) until the potential of the cathode areas is equal to or greater than the open circuit potential of the pit. As shown in Figure 1B, the open circuit potential of the pit (commonly called polarization potential) at −0.78 volt has been attained. At this potential there will no longer be any current flow from the pit; corrosion is thereby eliminated under the polarization phenomenon.

Since current distribution is always to the area of lowest surface voltage, it is impossible to raise the potential of part of the hull without raising the potential of all surfaces. This phenomenon is due to the extremely low electrical resistance (less than 0.001 ohm) of the hull. Therefore, polarization requires enough current flow to cause a simultaneous back E. M. F. change over the entire hull before protection will result to any part of the hull. If, for example, the current were sufficient only to raise the back E. M. F. to −0.65 volt, pit corrosion would still continue.

A basic distinction of electron concentration protection lies in the absence of any measurable increase in the back E. M. F. As shown in Figure 3C, the hull potential remains at the level of freely corroding steel, i. e., about −0.55 volt. Nonetheless, corrosion is prevented. Without intending to be bound thereto, applicant theorizes that the protection is due to a capacitance effect attributable to use of high resistance anodes. Experimentation has shown that anodes having less than 0.4 ohm resistance can protect only through the polarization mechanism even if more than 3 volts are applied at the anode, and regardless of the current density. Corrosion simply continues until sufficient current is applied to raise the entire hull to a potential of polarization value, i. e. —0.78 volt.

However, by applying a voltage in excess of 3 volts, preferably 10–30 volts, to an anode with a resistance of at least 0.45 ohm, a capacitance effect results which serves to protect against corrosion.

One of the fundamentals of a capacitor is that there will be a higher concentration of electrons on the surface of the negative plate than on the positive plate when a voltage is applied across the plates. The definition of one Farad is that there are $6.3 \times 10^{18}$ more electrons on the negative plate than on the positive plate with 1 volt plate to plate potential. The normal capacitor has very high plate to plate resistance; in total the concentration of electrons at the negative plate will be a function of applied voltage and resistance of dielectric as well as plate area.

In the electron concentration method there is created a capacitor which has a very low dielectric medium between plates, to wit the sea water, but nevertheless one which concentrates electrons on the surface of the outer hull which is the negative plate. Since the dielectric properties of both the anode-sea water interface and the hull-sea water interface are poor, current flows. The actual current level is determined by the $V/R$ relationship of the circuit components as in any other direct current circuit, and can be predetermined by appropriate selection of the applied voltage ($V$) and the anode resistance ($R$). It can now be seen that the anode resistance measured in the manner discussed is actually the resistance across the plates of the capacitor. It is noteworthy that polarization systems employing the conventional low resistance anodes do not inherently attain protection through the capacitance effect of the electron concentration method. The reason for this lies in the fact that low resistance anodes allow so much current to flow through the system that polarization is attained long before the current density at the anode is high enough to result in a capacitance effect.

The cathode or hull area is extremely large, and its sea water interface represents negligible resistance; on the other hand the anode-sea water interface resistance is high and is the major resistance in the electrical flow path. The resistance at the anode is responsible for production of the capacitance charge on the cathode surface, and the value of anode resistance is the important criteria. It is visualized that capacitance measurements would be useful for alternatively setting up criteria of protection.

To visualize the meaning of a capacitance charge (electron concentration) at the surface of the steel hull, consider first that a corroding point or anodic pit has a positive charge. A basic definition of positive charge is that there are fewer electrons in the positive part of a circuit compared to the negative part. In a corosion circuit, negative ions in the electrolyte are drawn to the anode; presence of the negative charge is related to induction of an equal and opposite (anode voltage) charge on the surrounding steel surface and flow of current to cathode areas.

Electron concentration in the negative part of the circuit forces electrons to all surfaces. Anodic points on the surface which were positively charged (because of a concentration of negatively charged ions in the sea water opposite them) are now supplied with an excess of electrons. As a reuslt the positively charged anodes cease to exist; negative ions in the sea water are repelled by the electrons on the hull surface. Corrosion prevention and elimination is complete—all surfaces are cathodic.

Cathode surface area is usually far greater than anode surface area. Elimination of anodes by the practice of this invention should not be expected to change the average surface voltage from that of the original corrosion circuit. Measurements corroborate this. It is conceivable that if the current output of the electrode system is far below that of summation of local corrosion anodes, and actual lowering of surface voltage (due to a drop in partial polarization) will occur.

Theoretically, in the electron concentration mechanism of cathodic protection the anode resistance could be made very high (e. g., by decreasing electrode surface area) and current very low. A balance between optimum current and circuit resistance for each installation probably exists, depending on economic and other considerations.

The new mechanism of electron concentration has eliminated anodic areas directly.

The prior art mechanism of polarization has dealt primarily with the wrong area—all the applied energy is expended as current flow to cathode surfaces—areas of no corrosion.

In operation, the flow of current from the high resistance anodes is not ordinarily sufficient to result in polarization of the hull, and the hull potential will remain at the level of freely corroding steel (—0.55 v.) in sea water, while under protection by electron concentration.

Aside from the demonstrable result of preventing hull corrosion there is long standing experimental verification to the theory that a concentration of electrons on the hull will result from employment of the specified anode and voltage, namely the well known ice pail experiment performed by Michael Faraday with a metal ice pail, an electroscope and a metal sphere. The electroscope is connected to the outer surface of the pail.

Quoting a description of this experiment from a standard college text in elementary physics—Physics by Hausman and Slack, second edition, published August 1939, p. 338—

"When the sphere is charged from an outside source and lowered into the pail the leaves of the electroscope diverge. The sphere may then be moved around inside the pail, touched to its inner surface, and removed, without causing any further change in the electroscope. After touching the sphere to the pail and removing it, both the sphere itself and the inner surface of the pail will be found entirely free from charge."

The text goes on to say that this result is explained by assuming a positive sphere lowered into the ice pail.

"It attracts the free electrons in the metal pail to the inner surface, and consequently the outer surface, together with the electroscope, are left positive. Upon touching the sphere to the pail the induced charge on the inside of the pail and the inducing charge on the sphere neutralize each other. The charge on the outside of the pail, which before contact was as large as that on the inside, must therefore be equal to the initial amount on the sphere, and of the same sign. Consequently it may be concluded that a charge induces an equal and opposite charge on the surrounding surface. It is also seen that a charge cannot exist inside of a conductor, unless this region also contains an equal and opposite charge, but will reside on the outer surface."

As has been previously pointed out, any inadvertence which causes underprotection to occur merely results in a minor degree of corrosion at the bow portion. In fact, the extent of corrosion, if present, at the bow section when the ship is next in drydock can serve as a good criterion for determining whether one or more additional anodes should be installed on the shop. It should be borne in mind that this desirable result of partial protection is attributable to the fact that each anode is a positive plate of a capacitor and acts thereby to individually prevent corrosion of the hull regardless of the number and existence of other anodes.

Actually it is difficult to determine the existence of underprotection in any other manner than by visual inspection of the presence of corrosion at the region furthest from the anodes. Because each ship presents a unique situation, the number of anodes needed for complete protection is but an engineering estimate. Wastage of power can, of course, be determined by ascertaining the existence of polarization, e. g. through voltage measurement. The same hull potential measurement is meaningless for determination of whether the ship is underprotected. As shown in Figure 3C, the hull potential will not ordinarily rise above the level of freely corroding steel (about —0.55 v. to calomel). It is contemplated that a ship protected by electron concentration according to the practice of this invention and with constant voltage power supply may actually exhibit polarization of the hull for the first month or two between succesive drydock overhaul (and therefore be protected by both mechanisms), but for the ten or eleven month balance (i. e. at least 70%) of the time between successive drydock overhauls, no polarization exists and hull potential measurements, if made, would indicate less than —0.7 v. to calomel or about the same as for freely corroding steel. The fact that substantially complete hull protection has existed throughout the time period will, of course, be determined by visual inspection when the ship is next in drydock.

A ship protected by the electron concentration system will have the same outward physical appearance as a ship protected by polarization. All protected surfaces will present a clean smooth look with whitish deposits forming thereon.

Electron concentration systems tend to produce results superior to polarization systems. As has been pointed out, depolarization resulting from turbulence is not a factor in this new method; a better job of protection at the bow and stern where turbulence is highest will result. Ships which scrape their bottoms over sand bars and which remain unprotected by paint are protected with far less equipment under the electron concentration method as compared to what is required for polarization.

Electron concentration methods are better able to protect crevices and recesses and for example will be able to protect sea chest interiors despite the heavy metal debris screens at their face; polarization current would not pass the screen. Interiors of some of the large diameter piping leading to steam condensers will be given protection by electron concentration, with whitish deposits forming as an indication of protection.

The brass liner of the tailshaft, the tailshaft tunnel and the propeller will come under protection by electron concentration methods (all of which is virtually impossible by polarization systems. Polarization of a propeller may require as much current as the hull itself, doubling the amount of cathodic protection equipment required). These considerations make electron concentration systems very attractive to the ship owner.

Regardless to what extent the foregoing explanation of the theory behind the hull protection afforded by this invention shall prove to be correct, a proper and complete protection of ships' hulls against corrosion can be effected by following the teachings hereinabove set forth, and the metes and bounds of the invention are to be determined only by the scope of the appended claims.

What is claimed is:

1. A method of substantially reducing corrosion of the hull of a ship exceeding 15,000 square feet of submerged surface which comprises: providing at least three power fed anodes mounted on the hull and insulated therefrom by a dielectric panel, each said anode being constructed and mounted to have a resistance exceeding 0.45 ohm for the anode to sea water of the Gulf Stream; passing low voltage direct current in excess of about 3 volts to each said anode and thereby applying current to said hull in excess of 0.05 milliampere per square foot of hull surface submerged in a sea water environment, said direct current being of a magnitude below that needed for polarization of the entire hull whereby the open circuit voltage of said protected hull in sea water does not exceed —0.70 volt as measured against a calomel half cell.

2. A method of substantially reducing corrosion of the hull of a ship exceeding 15,000 square feet of submerged surface which comprises: providing at least three power fed anodes mounted on the hull and insulated therefrom by a dielectric panel, each said anode being constructed and mounted to have a resistance exceeding 0.45 ohm for the anode to sea water of the Gulf Stream; passing low voltage direct current in excess of about 3 volts to each said anode and thereby applying current to said hull in excess of 0.05 milliampere per square foot of hull surface submerged in a sea water environment, said current being of a magnitude to polarize the entire hull while the paint on the hull is fresh, but for the major portion of the period between successive drydock overhaul said current being insufficient to raise the back E. M. F. of the ship's hull in sea water above —0.70 volt as measured by a calomel half cell.

3. The process of claim 1 wherein a fixed voltage is applied to said anodes throughout the period.

4. The process of claim 1 wherein each anode individually prevents corrosion regardless of the total number of anodes.

References Cited in the file of this patent

UNITED STATES PATENTS

| 1,467,890 | Wilkie et al. | Sept. 11, 1923 |

FOREIGN PATENTS

| 13,971 | Great Britain | Sept. 5, 1890 |
| 614,799 | Great Britain | Dec. 22, 1948 |